(12) United States Patent
Pedro et al.

(10) Patent No.: US 9,244,876 B2
(45) Date of Patent: Jan. 26, 2016

(54) METHOD AND APPARATUS PERTAINING TO UNIVERSAL SERIAL BUS-BASED CHARGING

(71) Applicant: Research In Motion Limited, Waterloo (CA)

(72) Inventors: Justin Manuel Pedro, Waterloo (CA); Ahmed Abdelsamie, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 468 days.

(21) Appl. No.: 13/721,929

(22) Filed: Dec. 20, 2012

(65) Prior Publication Data

US 2014/0181350 A1 Jun. 26, 2014

(51) Int. Cl.
*G06F 13/40* (2006.01)
(52) U.S. Cl.
CPC ........ *G06F 13/4077* (2013.01); *G06F 13/4072* (2013.01)
(58) Field of Classification Search
CPC .............. G06F 13/385; G06F 13/4081; G06F 2213/0042
See application file for complete search history.

(56) References Cited

U.S. PATENT DOCUMENTS

| | | | |
|---|---|---|---|
| 6,732,218 B2 * | 5/2004 | Overtoom et al. | 710/313 |
| 7,193,442 B2 * | 3/2007 | Zhu | 326/82 |
| 7,882,288 B2 * | 2/2011 | Moosavi | 710/106 |
| 7,949,802 B2 | 5/2011 | Gallant et al. | 710/36 |
| 8,447,890 B1 * | 5/2013 | LeTourneur et al. | 710/8 |
| 2006/0076977 A1 | 4/2006 | Zhu | |
| 2007/0239924 A1 | 10/2007 | Foo et al. | |
| 2008/0265838 A1 * | 10/2008 | Garg et al. | 320/115 |
| 2010/0070659 A1 * | 3/2010 | Ma et al. | 710/14 |

OTHER PUBLICATIONS

Brando—"MicroUSB OTG 3-Port Hub with Card Reader"—4 pages, Printed Apr. 17, 2015.*
Extended European Search Report from related European Patent Application No. 13184663.6 dated May 28, 2014; 6 pages.

* cited by examiner

*Primary Examiner* — Brian Misiura
(74) *Attorney, Agent, or Firm* — Gary S. Winer; Fleit Gibbons Gutman Bongini & Bianco P.L.

(57) ABSTRACT

A control circuit (comprising, for example, a part of a charging hub for a portable electronic communications device) that is not configured to support USB On-The-Go-compatible Host Negotiation Protocol is operably coupled to a USB-ID connector and is configured to transmit an identifier via that USB-ID connector to prompt a USB device in function mode to serve as a USB host. A locally-available power supply can then serve to provide power to that USB device notwithstanding the latter's role as the host.

20 Claims, 5 Drawing Sheets

METHOD AND APPARATUS PERTAINING TO UNIVERSAL SERIAL BUS-BASED CHARGING

FIELD OF TECHNOLOGY

The present disclosure relates generally to electronic devices and more particularly to use of the Universal Serial Bus.

BACKGROUND

The Universal Serial Bus (USB) is a popular industry standard that defines the cables, connectors, and communications protocols used in a bus for physically connecting electronic devices to one another to facilitate both communications and the provision of power. Generally speaking the USB approach presumes that one such device will serve as the so-called A-device host (and hence source power and direct the communication activity) while the other device serves in the so-called B-device function mode (and hence receives power and otherwise responds to the host).

USB On-The-Go, often abbreviated USB OTG, is a specification that allows USB devices such as digital audio players and mobile phones to act as a host and to allow other USB devices (such as a USB flash drive, mouse, or keyboard) to be attached thereto. Unlike with conventional USB systems, USB OTG devices can drop the hosting role and act in the function mode when attached to another host. This approach can therefore be used, for example, to allow a mobile phone to act as host for a flash drive and read its contents but then act as a flash drive when plugged into a host computer and allow the host to read off the new content. To serve in these regards the USB On-The-Go and Embedded Host Supplement to the USB 2.0 specification introduced three new protocols, the Attach Detection Protocol (ADP), the Session Request Protocol (SRP), and the Host Negotiation Protocol (HNP).

ADP allows an OTG device to determine attachment status in the absence of power on the USB bus. This enables both insertion-based behavior and the possibility for a device to display attachment status. ADP does this by providing for periodic measurement of capacitance on the USB port to determine whether there is another device or a dangling cable attached, or nothing attached. When a change in capacitance, large enough to indicate device attachment is detected then an A-device will provide power to the USB bus and look for device connection. A B-device will generate SRP and wait for the USB bus to become powered.

SRP allows both communicating devices to control when the link's power session is active (in standard USB, only the host is capable of doing so). SRP therefore allows finer control over power consumption. For example, the OTG or Embedded host can leave the USB link unpowered until the peripheral (which can be an OTG or standard USB device) asks for power thereby helping to preserve battery capacity.

For its part, HNP allows the two devices to exchange their host/function roles provided both are OTG dual-role devices. By using HNP for reversing host/peripheral roles, the USB OTG device is capable of acquiring control of data-transfer scheduling. Thus, any OTG device is capable of initiating data-transfer over USB OTG bus. The latest version of the supplement also introduced the idea of HNP polling whereby the device having the host role periodically polls the B-device, during an active session, to determine whether the latter wishes to become a host.

The A-device and B-device terminology mentioned above is actually a bit more nuanced than first suggested. This terminology defines which side supplies power to the link, and which is initially the host. The OTG A-device is a power supplier and the OTG B-device is a power consumer. The default link configuration is that the A-device acts as USB Host and the B-device is a USB peripheral that assumes the function role. The host and peripheral modes may be exchanged later by using HNP. Because every OTG controller supports both roles, they are often called "Dual-Role" controllers rather than "OTG controllers".

This expanded functionality, unfortunately, comes at a price—these new OTG protocols cannot pass through a standard USB hub since they are based on physical electrical-signaling. Compatibility, in turn, requires more complex (and expensive) connectors and controllers. As a result, implementation and usage of OTG-capable devices remains relatively weak.

DETAILED DESCRIPTION

Figure 1:
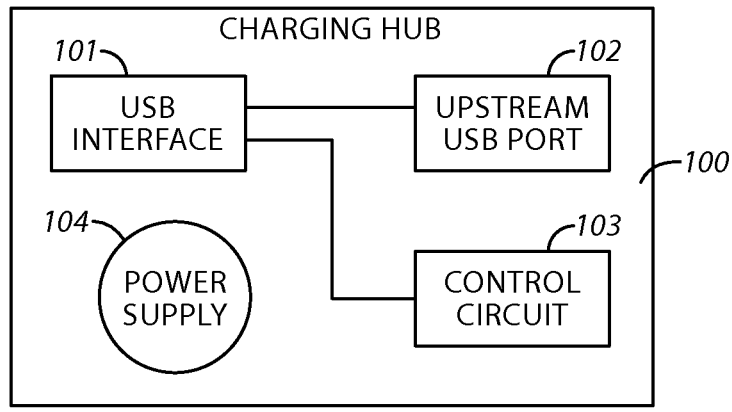
FIG. 1 is a block diagram in accordance with the disclosure.

The following describes an apparatus and method pertaining to a control circuit (comprising, for example, a part of a charging hub for a portable electronic communications device) that is not configured to support USB On-The-Go-compatible Host Negotiation Protocol but that is operably coupled to a USB-ID connector and that is configured to transmit an identifier via that USB-ID connector to prompt a USB device in function mode to serve as a USB host. A locally-available power supply can then serve to provide power to that USB device notwithstanding the latter's role as the host.

By avoiding the requirements of OTG, power can be provided to a USB host using only low-cost connector architecture and controller functionality. Such an approach also permits the USB device (which may comprise, for example, a portable electronic communications device) to serve in these regards without itself needing to have the ability to provide USB power and suffer the corresponding diminution of available power capacity.

These teachings are highly flexible in practice. For example, by one approach the aforementioned power supply can be non-selectively connected to the corresponding VBUS connector to thereby provide that power to the USB device that is serving as the USB host. By another approach, however, the power supply can be selectively connected to VBUS. The aforementioned control circuit can make and break that selective connection based, for example, upon USB device-sourced signaling on the USB-ID line. That selective connection itself can serve, by one approach, to selectively connect the power supply to VBUS for an upstream USB port and/or to VBUS for the USB device that is serving as the USB host.

These teachings are also scalable in practice and will accommodate, for example, hub-based application settings. By avoiding the physical and controller requirements of OTG USB approaches the present teachings facilitate non-traditional power-sourcing roles in a simpler and considerably less expensive way. The resultant expanded repertoire of device behavior, in turn, permits greater design freedom and increased opportunity to meet user requirements.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents an illustrative example of a charging hub 100 that accords with the present teachings. This charging hub 100 includes a USB interface 101 that comprises, at least in part, differential data connectors, a VBUS connector, and a USB-ID connector. These connectors are very well known in the art and require no further elaboration here. Those skilled in the art will also recognize and understand that such a USB interface 101 may well include other connectors as well, such as a ground connector. For the sake of clarity and simplicity the present description makes no reference to such additional connectors.

This charging hub 100 also includes an upstream USB port 102 that operably couples to the aforementioned USB interface 101. Again, such upstream USB ports constitute a well understood area of practice. Accordingly, for the sake of brevity further elaboration in these regards is not presented here.

The charging hub 100 in this illustrative example also includes a control circuit 103 that operably couples to at least the USB interface 101. Such a control circuit 103 can comprise a fixed-purpose hard-wired platform or can comprise a partially or wholly programmable platform. These architectural options are well known and understood in the art and require no further description here. This control circuit 103 is configured (for example, by using corresponding programming as will be well understood by those skilled in the art) to carry out one or more of the steps, actions, and/or functions described herein.

As illustrated, the charging hub 100 also includes a power supply 104. This power supply 104 may serve, for example, to provide 5 volts (Direct Current) at five hundred milliamperes. As will be described below in more detail, this power supply 104 can be selectively or non-selectively connected to VBUS lines as correspond to the USB interface 101 and/or the upstream USB port 102.

Those skilled in the art will recognize that such a charging hub 100 can include other components as desired. For example, such a charging hub 100 can optionally include a memory (not shown). Such a memory may be integral to the control circuit 103 or can be physically discrete (in whole or in part) from the control circuit 103 as desired. Such a memory can serve, for example, to non-transitorily store the computer instructions that, when executed by the control circuit 103, cause the control circuit 103 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Figure 2:
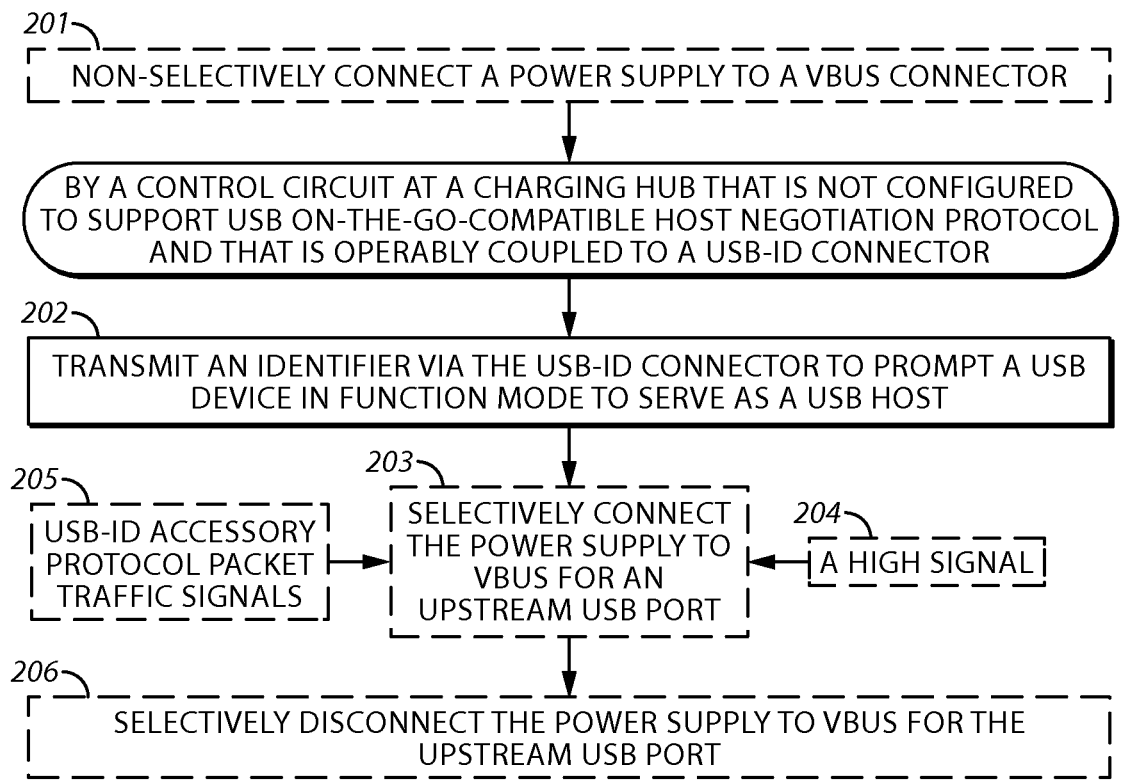
FIG. 2 is a flow diagram in accordance with the disclosure.

FIG. 2 presents a process 200 that can be carried out in conjunction with such a charging hub 100.

Figure 3:
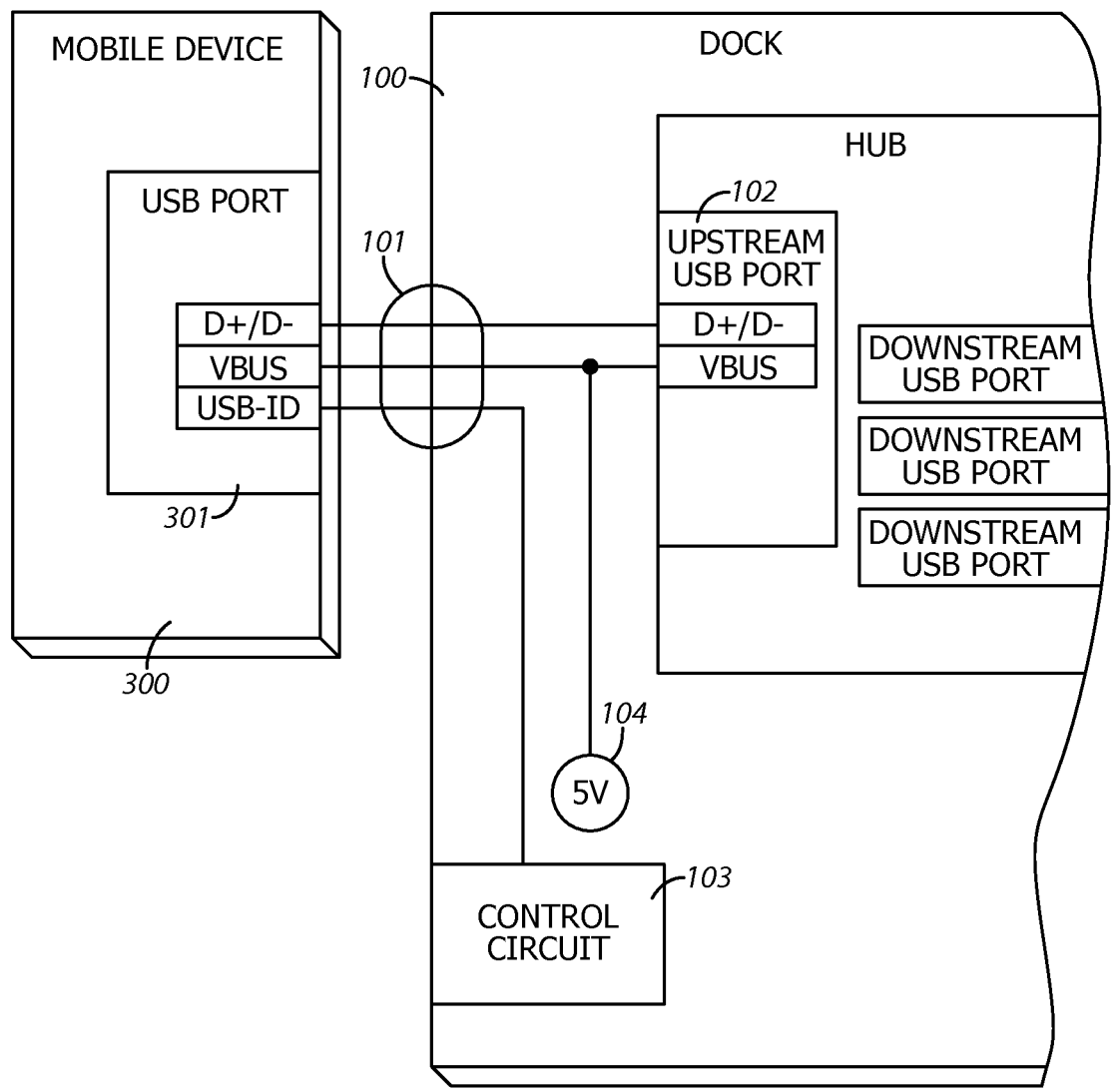
FIG. 3 is a block diagram in accordance with the disclosure.

In particular, and referring now to both FIGS. 2 and 3, by one optional approach this process 200 provides, at 201, for non-selectively connecting the aforementioned power supply 104 to a VBUS connector. As illustrated in FIG. 3, this configuration can comprise a non-selective connection to the VBUS line for both the upstream USB port 102 as well as the VBUS line of a connected mobile device 300 (via the aforementioned USB interface 101). (As used herein, this reference to a non-selective connection will be understood to refer to a non-switched connection; i.e., a connection that is not dependent upon a control strategy. That said, it will of course be understood that the depicted connection is dependent upon the VBUS line for the mobile device 300 being physically connected to the USB interface 101 for the charging hub 100 and hence is not necessarily a permanent connection.) So configured, power from the power supply 104 is always available to the VBUS line of the upstream USB port 102 and is immediately available to the mobile device 300 upon the latter being connected to the USB interface 101 (and even when the mobile device 300 serves as a USB host).

The remaining actions illustrated in FIG. 2 are carried out by the aforementioned control circuit 103. In particular, at 202, the control circuit 103 transmits an identifier via the USB-ID connector. This identifier serves to prompt a USB device such as the aforementioned mobile device 300 that is in the function mode to instead serve as a USB host. In particular, the USB protocol permits non-standard signaling under certain controlled circumstances via the USB-ID line. Accordingly, the control circuit 103 and the mobile device 300 can be configured to use and recognize a particular identifier of choice as having the described instructional impact and purpose. Those skilled in the art will recognize that such an identifier can be as simple or as elaborate as may suit the needs of a given application setting.

So configured, a mobile device 300 that initially presumes to assume a USB function role will quickly switch to a host role upon being connected to the USB interface 101 of such a charging hub 100. Notwithstanding that host role, however, the mobile device 300 will also receive power via the VBUS connector. In a typical application setting the mobile device 300 can utilize that power to charge its own on-board batteries. Such a configuration, in turn, permits the mobile device 300 to access (via, for example, the charging hub 100) other USB peripherals (such as cursor-movement controllers, keyboards, printers, and so forth) while avoiding rapid depletion of the mobile device's onboard portable power supply.

Figure 4:
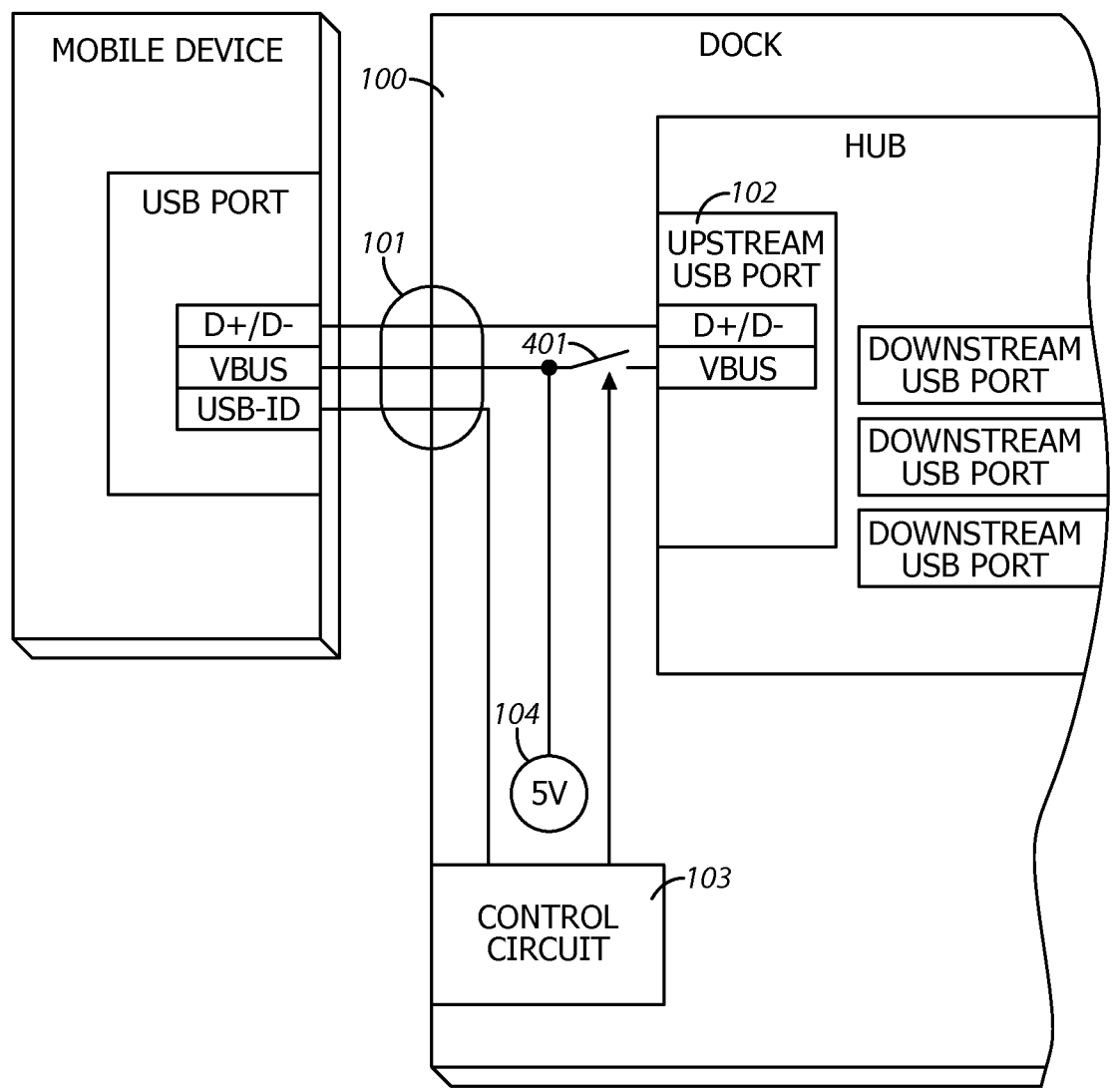
FIG. 4 is a block diagram in accordance with the disclosure.
Figure 5:
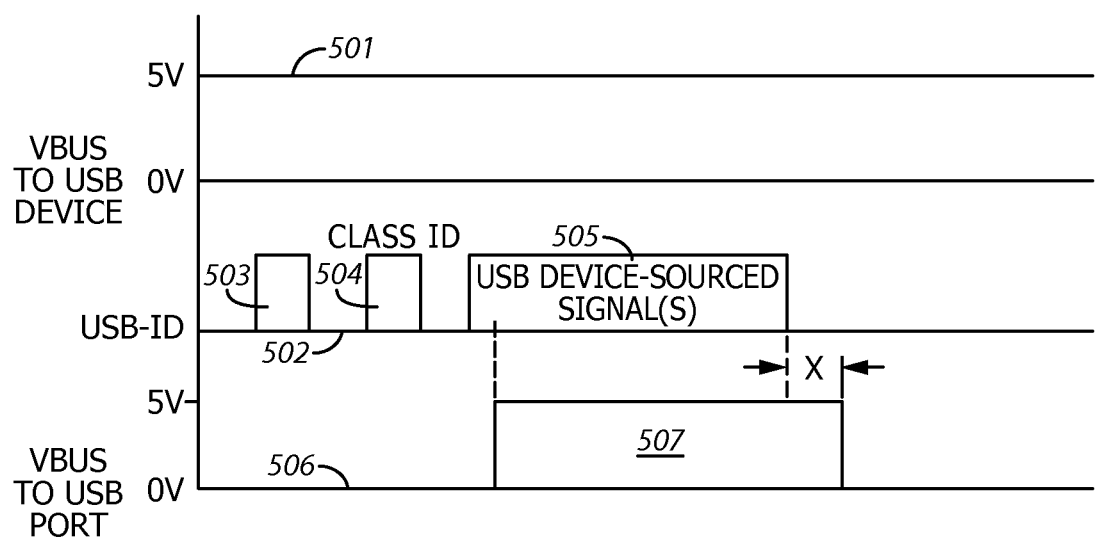
FIG. 5 is a timing diagram in accordance with the disclosure.

As mentioned above, the present teachings are highly flexible in practice. FIGS. 2, 4, and 5 provide further illustrative examples in these regards. Here, the power supply 104 is again non-selectively connected to the VBUS connector of the USB interface 101 (and hence the corresponding power will be immediately available to the mobile device 300). FIG. 5 illustrates this power on this VBUS line at reference numeral 501.

Also per this illustrative example, and via the USB-ID connector 502, the USB device sends a GET_PROPERTIES message 503 to which the control circuit 103 responds with the aforementioned identifier 504 via the USB-ID connector 502, all as illustrated in FIG. 5. (Those skilled in the art will understand and appreciate that the identifier 504 will likely be part of a larger response to the GET_PROPERTIES message 503, that identifier being only one of many properties being communicated in response to such a message.)

In this example, however, a control circuit-controlled switch 401 permits the power supply 104 to be selectively connected to VBUS for the upstream USB port 102 (at 203 in FIG. 2). The control circuit 103 can control this switching as a function, for example, of a USB device-sourced signal (or signals) 505 of choice. By one optional approach, for example, this signal 505 can comprise a high signal 204 such as, but not limited to, a 1.8 volt signal. By another optional approach this signal 505 can comprise USB-ID accessory protocol packet traffic signals. And by yet another approach the signal 505 can comprise polling signals as sourced by the mobile device 300. Those skilled in the art will recognize that other possibilities exist in these regards and that these specific examples are offered by way of illustration and without any suggestion of limitations in these regards.

So configured, and as illustrated in FIG. 5, the control circuit 103 can serve to selectively connect the power supply 104 to VBUS 506 for the upstream USB port 102 in response to detecting the aforementioned USB device-sourced signal 505 to thereby provide power 507 to that VBUS line 506.

By one approach, the control circuit 103 can be configured to detect when the USB device-sourced signal 505 concludes and then, at 206, selectively disconnect the power supply 104 from VBUS 506 for the upstream USB port 102. By one approach this response can depend upon the USB-ID connector going low for at least some predetermined period of time "X" (such as, by way of an illustrative example, about fifteen milliseconds though other durations of time are certainly possible and perhaps even preferable depending upon the specifics of a given application setting).

Figure 6:
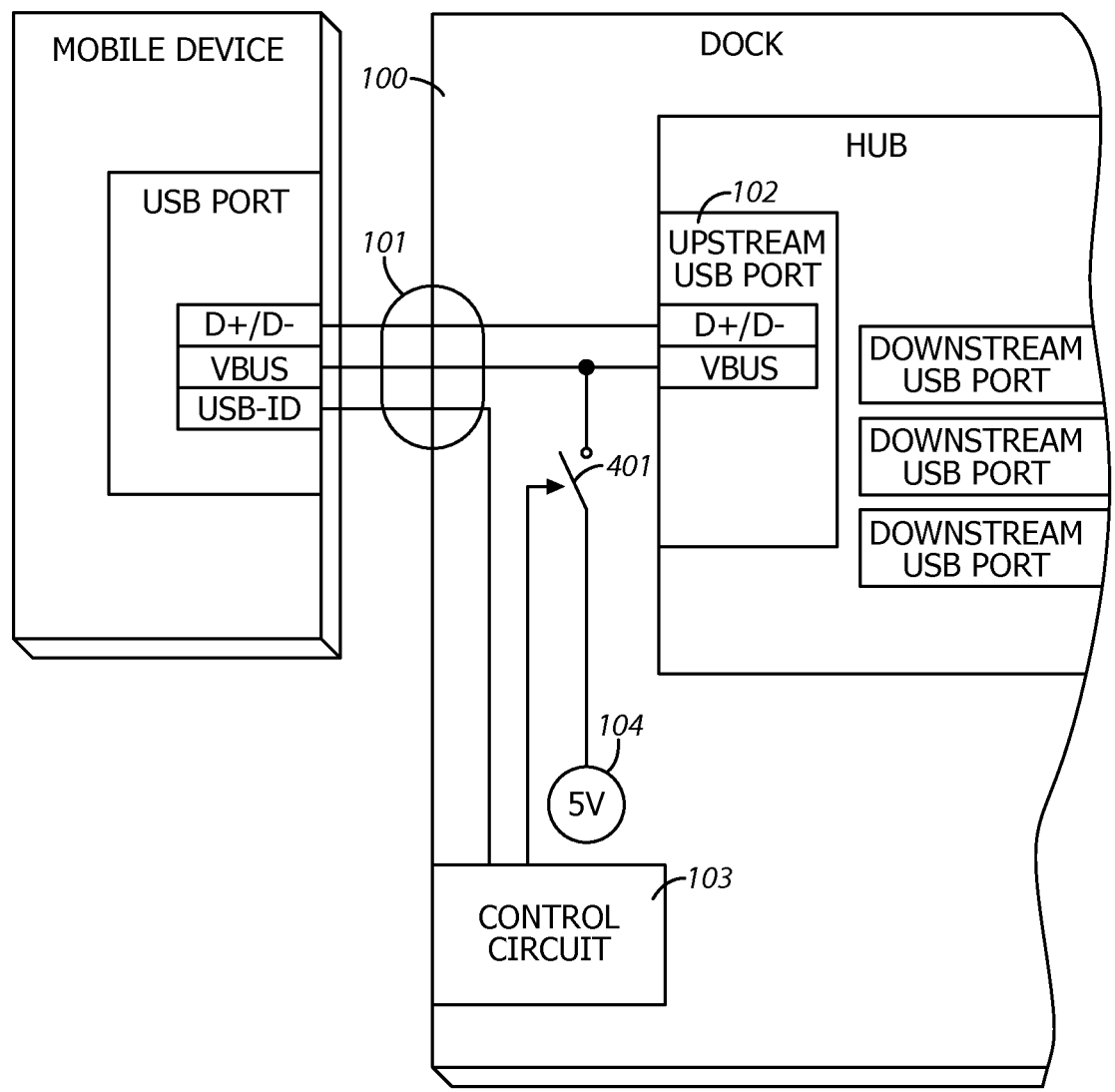
FIG. 6 is a block diagram in accordance with the disclosure.

In the illustrative examples just provided, the power supply 104 remains connected to the VBUS connector of the USB interface 101 but is switched with respect to VBUS for the upstream USB port 102. These teachings will accommodate other approaches in these regards, however. As one illustrative example in these regards, FIG. 6 illustrates using the switch 401 to selectively connect and disconnect the power supply 104 from both the VBUS connector at the USB interface 101 (and hence the mobile device 300) and the VBUS line for the upstream USB port 102.

So configured, with only minor changes a typical and standard USB-capable device can operate as a host while still having the benefit of receiving charging power from a charging hub. These teachings do not require (and in fact avoid) the necessary physical and controller changes that are associated with On-The-Go USB functionality and hence provide the described capability in a highly simplified and cost-effective manner.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A charging hub comprising:
    a Universal Serial Bus (USB) interface including differential data connectors, a VBUS connector, and a USB-ID connector;
    an upstream USB port that operably couples to the USB interface;
    a control circuit that is not configured to support USB On-The-Go-compatible Host Negotiation Protocol and that is operably coupled to the USB-ID connector and configured to transmit an identifier via the USB-ID connector to prompt a USB device in function mode to serve as a USB host.

2. The charging hub of claim 1 further comprising:
    a power supply that is non-selectively connected to the VBUS connector to thereby provide power to the USB device that is serving as the USB host.

3. The charging hub of claim 2 wherein the power supply is selectively connected to VBUS for the upstream USB port.

4. The charging hub of claim 3 wherein the power supply is selectively connected to VBUS for the upstream USB port via a control circuit-controlled switch.

5. The charging hub of claim 4 wherein the control circuit is configured to control the switch as a function, at least in part, of at least one of:
    USB-ID Accessory Protocol packet traffic signals; and
    a high signal.

6. The charging hub of claim 5 wherein the high signal comprises a 1.8V signal.

7. The charging hub of claim 5 wherein the control circuit is configured to open the switch in response to detecting that USB-ID connector goes low for at least a predetermined period of time.

8. The charging hub of claim 7 wherein the predetermined period of time is about fifteen milliseconds.

9. The charging hub of claim 5 wherein the control circuit is configured to open the switch in response to failing to detect a polling signal via the USB-ID connector.

10. The charging hub of claim 1 further comprising:
    a power supply that is selectively connected to both the VBUS connector to thereby provide power to the USB device that is serving as the USB host and to VBUS for the upstream USB port via a control circuit-controlled switch.

11. The charging hub of claim 10 wherein the control circuit is configured to control the switch as a function, at least in part, of at least one of:
    USB-ID Accessory Protocol packet traffic signals; and
    a high signal.

12. A method to facilitate charging a Universal Serial Bus (USB) host comprising:
    by a control circuit at a charging hub that is not configured to support USB On-The-Go-compatible Host Negotiation Protocol and that is operably coupled to a USB-ID connector:
    transmitting an identifier via the USB-ID connector to prompt a USB device in function mode to serve as a USB host; and
    non-selectively connecting a power supply to a VBUS connector to thereby provide power to the USB device that is serving as the USB host.

13. The method of claim 12, further comprising:
    selectively connecting the power supply to VBUS for an upstream USB port.

14. The method of claim 13 wherein selectively connecting the power supply to VBUS for an upstream USB port comprises, at least in part, selectively connecting the power supply to VBUS for the upstream USB port as a function, at least in part, of at least one of:
    USB-ID Accessory Protocol packet traffic signals; and
    a high signal.

15. A charging hub comprising:
    a Universal Serial Bus (USB) interface including differential data connectors, a VBUS connector, and a USB-ID connector;
    an upstream USB port that operably couples to the USB interface;
    a control circuit that is not configured to support USB On-The-Go-compatible Host Negotiation Protocol and that is operably coupled to the USB-ID connector and configured to transmit an identifier via the USB-ID connector to prompt a USB device in function mode to serve as a USB host; and a power supply that is selectively connected to the VBUS connector, in response to a signal from the USB host provided upon the USB-ID connector, to thereby provide power to at least one of the USB host and an upstream USB port.

16. The charging hub of claim 15, wherein the power supply is selectively connected via a control circuit-controlled switch.

17. The charging hub of claim 16, wherein the control circuit is configured to open the switch in response to failing to detect a polling signal via the USB-ID connector.

18. The charging hub of claim 16, wherein the control circuit is configured to control the switch as a function, at least in part, of at least one of:

USB-ID Accessory Protocol packet traffic signals; and
a high signal.

19. The charging hub of claim 16, wherein the control circuit is configured to open the switch in response to failing to detect a polling signal via the USB-ID connector.

20. The charging hub of claim 15, further comprising:

a power supply that is selectively connected to both the VBUS connector to thereby provide power to the USB device that is serving as the USB host and to VBUS for the upstream USB port via a control circuit-controlled switch.

\* \* \* \* \*